(12) United States Patent
Yaguchi

(10) Patent No.: US 9,056,436 B2
(45) Date of Patent: Jun. 16, 2015

(54) TIRE MOLD

(71) Applicant: SUMITOMO RUBBER INDUSTRIES, LTD., Kobe-shi, Hyogo (JP)

(72) Inventor: Masashi Yaguchi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 14/369,051

(22) PCT Filed: Nov. 28, 2012

(86) PCT No.: PCT/JP2012/080685
§ 371 (c)(1),
(2) Date: Jun. 26, 2014

(87) PCT Pub. No.: WO2013/108490
PCT Pub. Date: Jul. 25, 2013

(65) Prior Publication Data
US 2014/0377392 A1    Dec. 25, 2014

(30) Foreign Application Priority Data
Jan. 16, 2012    (JP) .................................. 2012-006373

(51) Int. Cl.
*B29C 33/20*    (2006.01)
*B29D 30/06*    (2006.01)

(52) U.S. Cl.
CPC ........ *B29D 30/0606* (2013.01); *B29D 30/0629* (2013.01); *B29D 2030/0631* (2013.01); *B29K 2905/02* (2013.01); *B29K 2905/12* (2013.01)

(58) Field of Classification Search
CPC .......................... B29D 30/0629; B29D 30/0631
USPC .................................................... 425/46, 47
See application file for complete search history.

(56) References Cited

U.S. PATENT DOCUMENTS

| 3,910,735 | A | 10/1975 | Caretta |
|---|---|---|---|
| 6,955,782 | B1 * | 10/2005 | Ratliff, Jr. ...................... 425/46 |
| 2008/0178990 | A1 | 7/2008 | Menard et al. |
| 2008/0191389 | A1 | 8/2008 | Hyodo |

FOREIGN PATENT DOCUMENTS

| JP | 48-47970 A | 7/1973 |
|---|---|---|
| JP | 2001-9837 A | 1/2001 |
| JP | 2003-39435 A | 2/2003 |
| JP | 2005-59510 A | 3/2005 |
| JP | 2008-114603 A | 5/2008 |
| JP | 2008-194946 A | 8/2008 |
| JP | 2010-76344 A | 4/2010 |
| JP | 2011-46069 A | 3/2011 |

* cited by examiner

*Primary Examiner* — James Mackey
(74) *Attorney, Agent, or Firm* — Birch, Stewart, Kolasch & Birch, LLP

(57) ABSTRACT

A tire mold constituted by arranging a pair of upper and lower side plates, a sector, a sector shoe holding the sector and an actuator, wherein a ring is provided on each outer diameter portion of the side plates, and when the mold is in fully closed state at room temperature, projection parts formed in the upper and lower sides of the sector shoe contact the outer diameter portion of the brim-like ring and when the mold has reached a vulcanization temperature in fully closed state, the inner diameter portion of the sector contacts the outer diameter portion of the side plate, and the projection parts formed in the upper and lower sides of the sector shoe are formed to contact the outer diameter portions of the ring.

1 Claim, 4 Drawing Sheets

TIRE MOLD

TECHNICAL FIELD

Present invention relates to a tire mold which is constituted with a split mold.

BACKGROUND OF THE INVENTION

In general, when producing a pneumatic tire, a tire mold which is constituted with a split mold is used. The mold is attached to a vulcanization machine (a press machine) after assembled at room temperature.

FIG. 5 is a sectional view illustrating a conventional tire mold, and FIG. 6 is a top view illustrating a fully closed state of the tire mold. Each of them illustrates a state after assembled.

As illustrated in FIG. 5, the tire mold 41 is constituted by arranging a pair of upper and lower side plates 51 and 52, a sector 53, a sector shoe 54 holding the sector 53, and an actuator 55, in sequence from an inner side to an outer side in a radial direction of the tire. And, 57 is a lower mold plate supporting the lower side plate 52, and 56 is an upper mold plate supporting the upper side plate 51.

In FIG. 5, an upper mold is constituted with the sector 53, the sector shoe 54, the actuator 55, the upper side plate 51, and the upper mold plate 56, and a lower mold is constituted with the lower side plate 52 and the lower mold plate 57.

At the time when the tire mold 41 assembled is fully closed, a position of the sector 53 against one pair of upper and lower side plates 51 and 52 is regulated when each of projection parts 53a and 53b formed in the upper and lower sides of the sector 53 contacts respectively each of outer diameter portions 51a and 52a of the side plates 51 and 52. And when the actuator 55 moves up and down, the sector 53 attached to the sector shoe 54 slides inwardly and inwardly along the tire radial direction.

Thus, although the moving range of the sector shoe 54 is regulated against actuator 55, a fixed play is provided in a tire peripheral direction and a tire radial direction at each sector shoe 54, as illustrated in FIG. 6, in order to make smooth sliding of the sector shoe 54 toward the tire diameter direction.

Since assembling of the tire mold 41 is performed at room temperature as described above, a clearance S is formed in a tire peripheral direction at each of sectors 53 made from aluminum in consideration of the thermal expansion by vulcanization temperature.

Accordingly, in an assembling stage of the tire mold 41, positions in peripheral direction of the sector shoe 54 and the sector 53 attached to the sector shoe 54 are not regulated.

And, although an entering margin of the sector 53 to a diameter direction is regulated when the sector 53 contacts side plates 51 and 52, the accuracy which regulates the position of sector 53 against side plates 51 and 52 becomes low in conjunction with the play of the above-mentioned peripheral direction, since an inner diameter of sector 53 is larger than an outer diameter of side plates 51 and 52 at the time of the assembling at room temperature. As a result, in an assembling stage of the conventional tire mold 41, the core of the upper mold against the lower mold is deviated to a small extent, the clearance S between sectors 53 is unevenly distributed, and the tire mold 41 is attached so that the upper mold inclines against the lower mold.

Therefore, conventionally, in assembling of the tire mold 41, the assembling has been performed by inserting a jig (an illustration is omitted) into a play between the sector shoe 54 and the sector 53 or a clearance S between sectors 53 themselves.

However, work load becomes large when such an insertion jig is used.

In the conventional mold, since the pressurization at a time of press was received by contacting the sector and side plate made from aluminum in a tire diameter direction and by contacting the sides themselves of the sectors in a tire peripheral direction, an inner periphery and a side of the sector wore out with the use of the mold, and therefore, correspondence to these problems were inevitable.

For such a problem, an art which prevents wear of sectors by contacting mutual sides of the sector shoes is disclosed in Patent Document 1. By deleting a clearance in the tire radial direction of the sector shoe, the effect of suppressing a deviation of the upper and lower molds is expected. However, since an entering margin to the tire radial direction of a sector shoe becomes fixed, a phenomenon happens in which the sector cannot be closed depending on a mold.

In Patent Document 2, an art is disclosed which controls a deviation of upper and lower molds by contriving the shapes of the bottom of a sector shoe and the upper surface of a lower mold container contacting thereto. However, wear of the sector cannot be prevented by the art.

PRIOR ART DOCUMENTS

Patent Documents

[Patent Document 1] JP2010-76344A
[Patent Document 2] JP2011-46069A

SUMMARY OF THE INVENTION

Problem to be Solved by the Invention

Then, considering above description, an object of the present invention is to provide a tire mold which does not develop a core deviation between upper and lower molds, and can prevent wear of a sector Means for Solving the Problem Invention according to claim 1 is:

A tire mold which is constituted by arranging a pair of upper and lower side plates, a sector, a sector shoe holding the sector and an actuator, in sequence from an inner side to an outer side to a radial direction of the tire, wherein a brim-like ring is provided on each outer diameter portion of said side plates of upper and lower pairs, and the form of said brim-like ring is such that, when the mold is in fully closed state at room temperature, projection parts formed in upper and lower sides of said sector shoe contact the outer diameter portion of said brim-like ring, thus resulting in determination of the positions of said sector shoe and said sector against the upper and lower pairs of said side plates, and when the mold has reached a vulcanization temperature in fully closed state, the inner diameter portion of said sector contacts the outer diameter portion of said side plate, and the projection parts formed in upper and lower sides of said sector shoe are formed to contact the outer diameter portions of said brim-like ring.

Effect of the Invention

According to the present invention, the tire mold which does not develop a core deviation between upper and lower molds and prevents wear of the sector can be provided.

BRIEF DESCRIPTION OF DRAWINGS

FIG. 4 is a perspective view illustrating a state where a sector is assembled to a standard jig.

EMBODIMENT FOR CARRYING OUT THE INVENTION

Hereinafter, the present invention is explained based on embodiments by referring to drawings.

1. Whole Structure of Tire Mold

Figure 1:
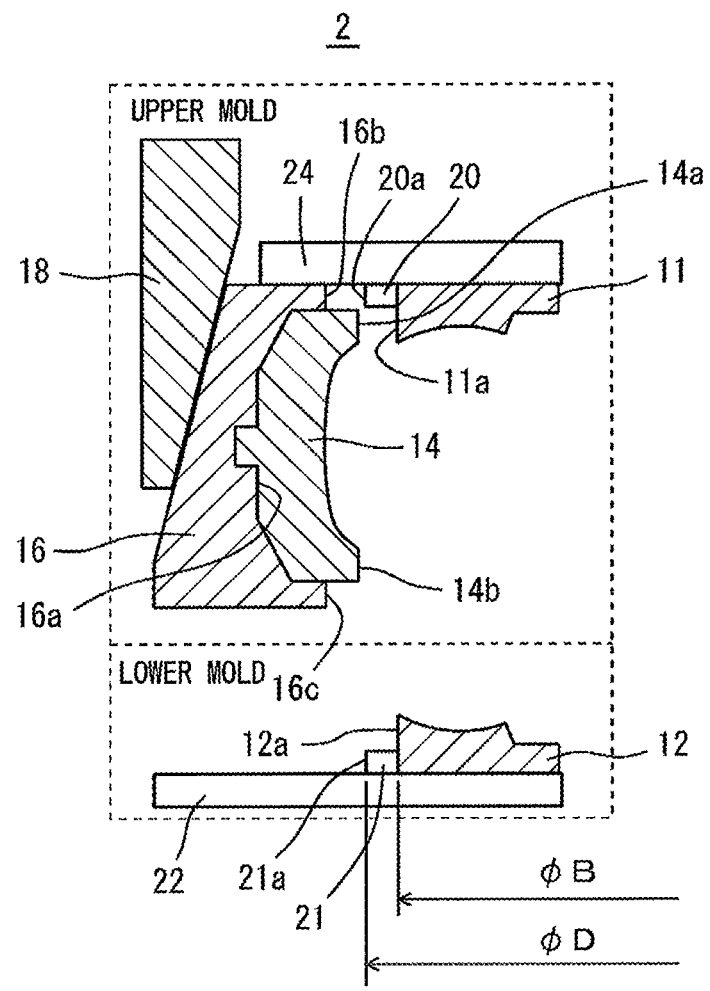
FIG. 1 is a sectional view illustrating the tire mold of an embodiment of the present invention.
Figure 2:
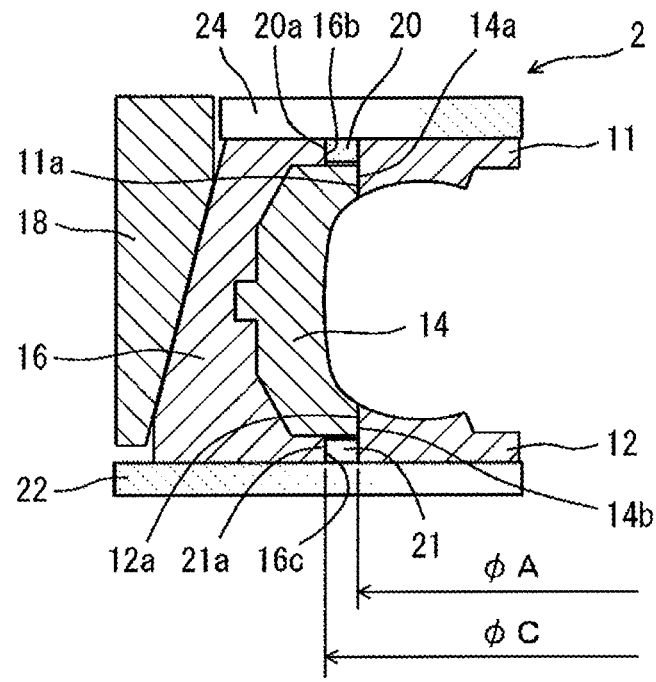
FIG. 2 is a sectional view illustrating a fully closed state of the tire mold of an embodiment of the present invention.
Figure 3:
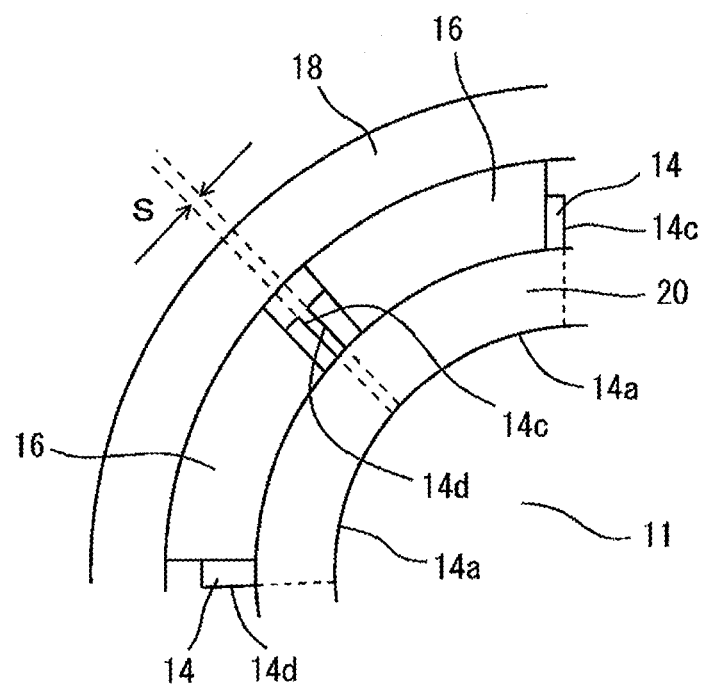
FIG. 3 is a top view illustrating a fully closed state of the tire mold of an embodiment of the present invention.
Figure 5:
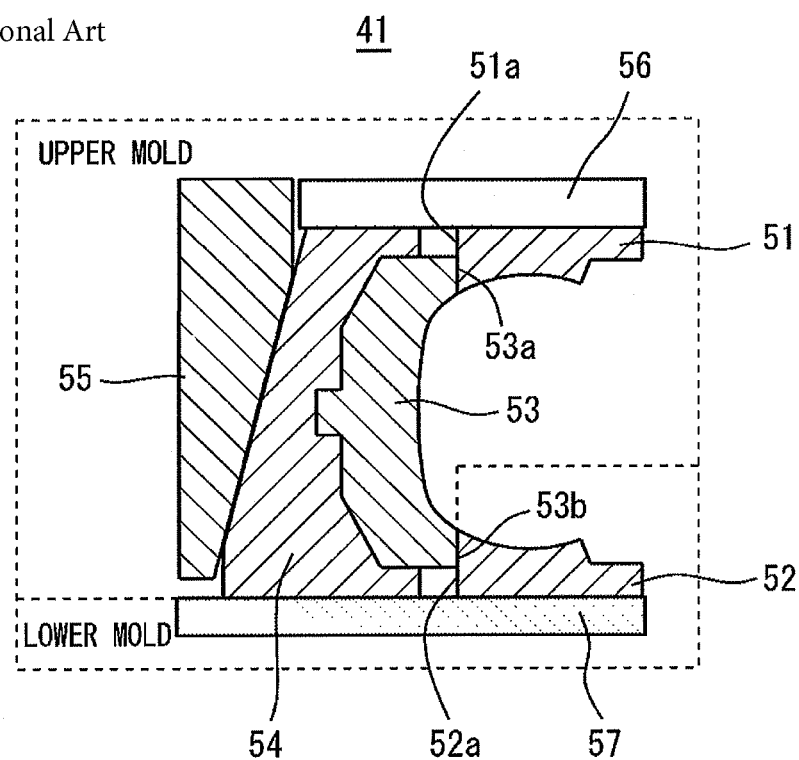
FIG. 5 is a sectional view illustrating a conventional tire mold.
Figure 6:
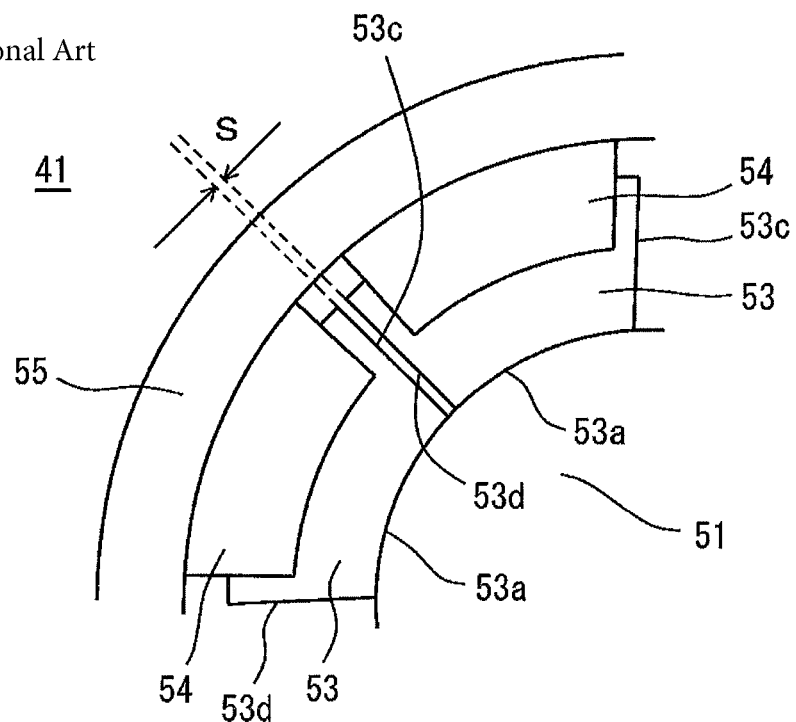
FIG. 6 is a top view illustrating a fully closed state of the conventional tire mold.

FIG. 1 is a sectional view illustrating the tire mold of the present embodiment, and FIG. 2 and FIG. 3 are a sectional view and a top view respectively illustrating a fully closed state of the tire mold of the present embodiment.

The tire mold 2 is a mold of a split mold-type to be installed in a press machine, wherein the mold 2 has the same constitution as the conventional tire mold, except that brim-like rings 20 and 21 described hereinafter are provided in each of outer diameter portions 11a and 12a of one pair of upper and lower side plates 11 and 12.

That is, the tire mold 2 is provided with a pair of upper and lower side plates 11 and 12, a plurality of sectors 14, a plurality of sector shoes 16 attached with each sector 14, an actuator 18 attached to each sector shoe 16, and an upper plate 24 and a lower plate 22 supporting each of side plates 11 and 12.

Each sector 14 is integrated in an inner circumferential surface 16a of a plurality of sector shoes 16. A plurality of sector shoes 16 are equally divided into a peripheral direction of tire T in the same number with the sectors 14, and are arranged in the shape of a ring. One sector 14 is held with one sector shoe 16. And, 14c and 14d are sides of the sector 14.

With respect to the tire mold 2 in the present embodiment, a ring is fixed to each of outer diameter portions 11a and 12a of one pair of upper and lower side plates 11 and 12 by welding etc., and an upper brim-like ring 20 and a lower brim-like ring 21 are formed in the upper part of the outer diameter portion 11a and the lower part of the outer diameter portion 12a, respectively.

The tire mold 2 is roughly divided into an upper mold and a lower mold. The upper mold is equipped with a sector 14, a sector shoe 16, an actuator 18, an upper side plate 11, an upper brim-like ring 20, and an upper mold plate 24. The lower mold is equipped with a lower side plate 12, a lower brim-like ring 21, and a lower mold plate 22 (refer to FIG. 1).

With respect to materials of the tire mold, aluminum alloy or aluminum, which is lightweight and easy for use in casting and manufacturing, is selected as the sector 14. Iron, whose thermal expansion is smaller than aluminum at vulcanization temperature, is selected as the side plates 11 and 12 and the brim-like rings 20 and 21. Iron is selected as the sector shoe 16.

2. Explanation of Brim-Like Ring

The brim-like rings 20 and 21 are formed as follows.

That is, when the tire mold 2 is assembled and fully closed under room temperature (about 25° C.), projection parts 16b and 16c formed in the upper and lower sides of the sector shoe 16 contact the outer diameter portions 20a and 21a of the brim-like rings 20 and 21, thus, positioning of the sector shoe 16 and the sector 14 attached to the sector shoe 16 against the side plates 11 and 12 may be performed.

When the tire mold 2 reaches vulcanization temperature in a fully closed state, while the inner diameter portions (projection parts 14a and 14b) of the sector 14 contact outer diameter portions 11a and 11b of the side plates 11 and 12, projection parts 16a and 16b formed in the upper and lower parts of the sector shoe 16 contact the outer diameter portions 20a and 21a of the brim-like rings.

And when, in a fully closed state of the tire mold 2, inner diameters of the projection parts 14a and 14b of the sector 14 are referred to as A, outer diameters of the one pair of upper and lower side plates 11 and 12 are referred to as B, and inner diameters of the projection parts 16b and 16c of the sector shoe 16 in a fully closed state are referred to as C, it is preferred to be formed so that an outer diameter D of the upper brim-like ring 20 or the lower brim-like ring 21 may satisfy the following formula:

$$-0.5<(C-D)-(A-B)<0.$$

Since the iron rings, the thermal expansion of which at vulcanization temperature is smaller than that of aluminum, are selected as the brim-like ring in the tire mold of the present embodiment as described above, it becomes possible to design a size of the ring against the size of the sector shoe in which the positioning is performed by contacting from the time of room temperature assembling.

3. Effects of the Present Embodiment (1) Since the brim-like ring formed as mentioned above is provided, the tire mold of the present embodiment can regulate occurrence of the core deviation between upper and lower molds in higher accuracy compared with the conventional tire mold which does not have such a brim-like ring.

And, since the tire mold assembled by regulating occurrence of the core deviation of the upper and lower molds in high accuracy can be attached to a press machine keeping a high accuracy as stated above, occurrence of a tire appearance defect resulted from the core deviation of the upper and lower molds can be fully suppressed.

(2) In the conventional tire mold, a partial wear of an inner circumferential surface and a side surface of a sector generates by continuing the pressurization to the mold in a state of having a core deviation of upper and lower molds. Different from the conventional tire mold, the partial wear of the inner circumferential surface and the side surface of the sector can be controlled in the present invention, thereby occurrence of a tire appearance defect can be further controlled, and useful life of the mold can be extended.

(3) In addition, since a core deviation of the upper and lower molds, and an uneven distribution in the clearance and the sector in a tire peripheral direction are dissolved, improvement in tire uniformity can be attained.

(4) Furthermore, since the pressure of the press machine can be received by contacting of the iron brim-like ring and the side plate, wear and decrease of circularity accuracy of the sector, which occur during use, can be suppressed.

EXAMPLES

In the following, various evaluations were performed using the above-mentioned tire mold equipped with a sector having an inner diameter of an inner circumferential surface of A (mm), a side plate having an outer diameter of B (mm), and a sector shoe having an inner diameter of an inner circumferential surface of C (mm) and by changing an outer diameter D (mm) of the brim-like ring made of SS material (common structural rolled steel).

The inner diameter A of the inner circumferential surface of the above-mentioned sector is an inner diameter measured after assembling the sector to the standard jig 30, as illustrated in FIG. 4.

1. Experiment

Each tire mold was manufactured and used for 200 days, wherein the outer diameter D of the brim-like ring was set to be "(C−D)−(A−B)" as shown in each of Table 1.

2. Evaluation Method

After use for 200 days, an amount of wear of the sector inner diameter (mm) and a circularity change (mm) of the sector were measured, and the existence of an appearance defect occurrence in a produced tire was checked, and a comprehensive judgment was performed by "OK" and "NG". Results are shown in Table 1.

TABLE 1

| | Judgment | (C−D)−(A−B) (mm) | Appearance defect occurrence | Amount of sector inner diameter wear (mm) | Sector circularity change (mm) |
|---|---|---|---|---|---|
| Comparative example 1 | NG | 2.0 | present | 0.53 | 0.05 |
| Comparative example 2 | NG | 1.5 | present | 0.51 | 0.04 |
| Comparative example 3 | NG | 1.0 | absent | 0.24 | 0.02 |
| Example 1 | OK | 0.5 | absent | 0.05 | 0 |
| Example 2 | OK | 0.0 | absent | 0.03 | 0 |
| Example 3 | OK | −0.5 | absent | 0 | 0 |
| Comparative example 4 | NG | −1.0 | present | 0 | 0 |
| Comparative example 5 | NG | −1.5 | present | 0 | 0 |
| Comparative example 6 | NG | −2.0 | present | 0 | 0 |

3. Evaluation

In the case of comparative examples 1 and 2, the judgment was "NG", since the appearance defect occurred, and the amount of sector inner diameter wear and the sector circularity change were beyond tolerance level, as shown in Table 1.

In the case of comparative example 3, although the appearance defect did not occur, the amount of the sector inner diameter wear and the sector circularity change were beyond tolerance level to be judged as "NG". The reason for this is thought as such that, since the outer diameter of the ring was too small, the sector was worn out by the pressure of the press machine, and the sector circularity was changed.

In the case of comparative examples 4-6, since the appearance defect occurred notwithstanding the absence of the amount of sector inner diameter wear and the sector circularity change, the judgment was "NG". The reason for this is thought as such that, since the outer diameter of the ring was too large, the gap was produced between the side plate and the sector at the time of press.

In the case of Examples 1 to 3, the judgment was "OK", since the appearance defect did not occur, and the amount of the sector inner diameter wear and the sector circularity change were within tolerance level. This is because the outer diameter of the ring was set up appropriately. In particular, in the case of Example 3, the appearance defect did not occur, and the amount of sector inner diameter wear and the sector circularity change were not observed to it, either. Therefore, an especially desirable result was obtained.

From the above results, it is understand that an appearance defect, a sector inner diameter wear, and a sector circularity change are not produced when the tire mold is provided with the brim-like ring formed in suitable shape.

Although the present invention was explained based on the embodiments as mentioned above, the present invention is not limited to the above-mentioned embodiments. Within the same and equivalent scope with the present invention, various changes can be added to the above-mentioned embodiments.

DESCRIPTION OF THE REFERENCE SIGNS 2, 41 tire mold
11, 51 upper side plate
11a, 51a outer diameter portions of upper side plate
12, 52 lower side plate
12a, 52a outer diameter portions of lower side plate
14, 53 sector
14a, 14b, 53a, 53b projection part of sector
14c side of sector.
14d side of sector
16, 54 sector shoe
16a inner circumferential surface of sector shoe
16b, 16c projection part of sector shoe
18, 55 actuator
20 upper brim-like ring
20a outer diameter portion of upper brim-like ring
21 lower brim-like ring
21a outer diameter portion of lower brim-like ring
22, 57 lower mold plate
24, 56 upper mold plate
A inner diameter of the projection part of sector in a fully closed state
B outer diameter of side plates
C inner diameter of the projection part of sector shoe in a fully closed state
D outer diameter of brim-like ring
S clearance

What is claimed is:
1. A tire mold which is constituted by arranging a pair of upper and lower side plates, a sector, a sector shoe holding the sector and an actuator, in sequence from an inner side to an outer side in a radial direction of the tire, wherein a ring is provided on each outer diameter portion of said side plates, and the form of said ring is such that, when the mold is in fully closed state at room temperature, projection parts formed in upper and lower sides of said sector shoe contact outer diameter portions of said rings, thus resulting in determination of the positions of said sector shoe and said sector against said side plates, and when the mold has reached a vulcanization temperature in fully closed state, an inner diameter portion of said sector contacts the outer diameter portions of said side plates, and the projection parts formed in the upper and lower sides of said sector shoe are formed to contact the outer diameter portions of said rings.

* * * * *